(12) United States Patent
Murphy et al.

(10) Patent No.: US 8,392,375 B2
(45) Date of Patent: Mar. 5, 2013

(54) PERPETUAL ARCHIVAL OF DATA

(75) Inventors: Elissa E. Murphy, Seattle, WA (US);
Yan V. Leshinsky, Bellevue, WA (US);
John D. Mehr, Kenmore, WA (US);
Navjot Virk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 12/408,972

(22) Filed: Mar. 23, 2009

(65) Prior Publication Data
US 2010/0241616 A1    Sep. 23, 2010

(51) Int. Cl.
    G06F 7/00    (2006.01)
(52) U.S. Cl. .................. 707/664; 707/668; 707/674
(58) Field of Classification Search .......... 707/661–693
    See application file for complete search history.

(56) References Cited

U.S. PATENT DOCUMENTS

| | | | |
|---|---|---|---|
| 6,266,679 B1 | 7/2001 | Szalwinski et al. | |
| 7,284,017 B2 | 10/2007 | Baune | |
| 7,343,453 B2 | 3/2008 | Prahlad et al. | |
| 7,783,596 B2 * | 8/2010 | Smolen et al. | 707/609 |
| 2003/0204755 A1 | 10/2003 | Morris | |
| 2006/0101088 A1 | 5/2006 | Frohn | |
| 2007/0177739 A1 | 8/2007 | Ganguly et al. | |
| 2007/0223658 A1 * | 9/2007 | Moore | 379/37 |
| 2009/0300409 A1 * | 12/2009 | Bates et al. | 714/5 |

OTHER PUBLICATIONS

Christopher Val Studholme, "Secure distributed backup: Erasure codes and anoymous message delivery", copyright 2007.*
Active Circle: Future-Proof Storage for Unstructured Data, Mar. 2008 http://www.active-circle.com/images/rep_editeur_html/File/Docs%20English/Active%20Circle%20-%20Taneja%20Group%20-%20Mar.%202008.pdf. Last accessed Jan. 28, 2009, 8 pages.
Copan Systems https://www.copansystems.com/library/library.php?fid=267. Last accessed Jan. 28, 2009, 8 pages.
Bradshaw, et al. Archive Storage System Design for Long-Term Storage of Massive Amounts of Data. Published online Jun. 3, 2008. IBM Journal of Research and Development—Storage Technologies and Systems, vol. 52, No. 4/5, 2008. http://www.research.ibm.com/journal/rd/524/bradshaw.html. Last accessed Jan. 28, 2009, 11 pages.
Literature: White Papers http://www.terastacksolution.com/literature.php. Last accessed Jan. 28, 2009, 2 pages.
Storer, et al. Potshards: Secure Long-Term Storage without Encryption. 2007 USENIX Annual Technical Conference. http://www.ssrc.ucsc.edu/Papers/storer-usenix07.pdf. Last accessed Jan. 28, 2009, 14 pages.

* cited by examiner

*Primary Examiner* — Cindy Nguyen
(74) *Attorney, Agent, or Firm* — Wolfe-SBMC

(57) ABSTRACT

The claimed subject matter relates to a network-accessible, online data archival service with a data store for archiving data for clients of the archival service. The archival service can include an architecture that can facilitate perpetual sustainability and accessibility of data by conforming to a model. In particular, the model can describe or define a minimum set of extensible or pluggable components or modules needed to facilitate and guarantee sustainability of and accessibility to the data in perpetuity.

18 Claims, 9 Drawing Sheets

PERPETUAL ARCHIVAL OF DATA

BACKGROUND

Since the launch of the computer revolution decades ago, data has been steadily migrated or been duplicated to exist in electronic or digital form. Today, a very significant portion of personal or other information about many individuals or other entities exists in this form, and those individuals or entities have come to rely on the utility and convenience of computer-based data storage, since these data stores can be accessed by way of computer networks.

Given this growth and the convenience of computer-based archival of data, numerous data storage services have entered the marketplace. These data storage services typically host or maintain the data associated with the user in exchange for a service fee. However, no prior system or service has been able to offer or guarantee that a client entity's data will be digitally stored and available to the client in perpetuity.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can facilitate perpetual sustainability and accessibility of data. In accordance therewith and to other related ends, the architecture can include a network-accessible data store that can operate in connection with an online service or within the framework of a cloud service. The data store can archive data for a client of an associated data storage service according to a model for perpetually maintaining the data in a manner that can be persistently accessibly to the client.

Hence, a set of extensible or exchangeable components or modules can be included in or operatively coupled to the data store in order to effectuate the perpetual sustainability and accessibility of the data. In addition, the model can describe or define the set (potentially a minimum set) of components. Moreover, the architecture can dynamically update or upgrade the components, by extending them with new features or plugging in new components, e.g., based upon performance level assessments or inferences.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
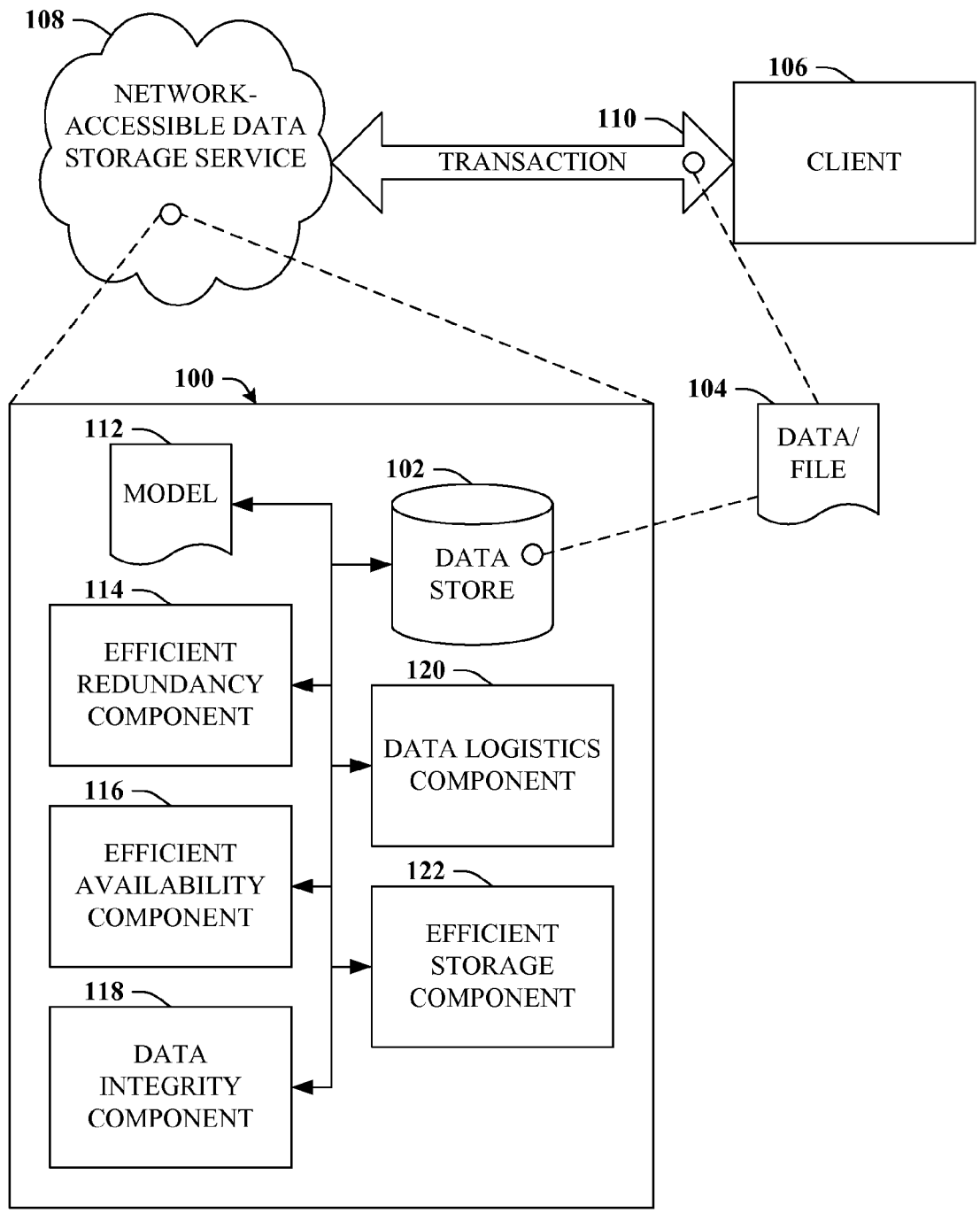
FIG. 1 illustrates a block diagram of a computer-implemented system that can facilitate perpetual sustainability and accessibility of data.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can facilitate perpetual sustainability and accessibility of data is depicted. Generally, system 100 can include a network-accessible data store that can archive data for a client of an associated data storage service. According to FIG. 1, an example of the data store is provided by reference numeral 102, with the data storage service that hosts, manages, and/or maintains data store 102 illustrated by reference numeral 108. Thus, data 104 (e.g., one or more data files of client 106) can be archived by data store 102 when provided to data store 102 and/or data storage service 108. Hence, client 106 can archive data 104 or subsequently access, update, or retrieve data 104, which is illustrated by way of transaction 110. One or more transactions 110 can be accomplished by way of substantially any suitable wide area or local area network.

It should be understood that data store 102 can be hosted on a centralized server (or other device) or server array, or on a set of servers that are geographically distributed. Regardless, data store 102 and/or data storage service 108 can effectuate transactions 110 based upon a service-based or cloud-based scheme. Furthermore, all or portions of data store 102 can be embodied as substantially any type of memory, including but not limited to volatile or non-volatile, solid state, sequential access, structured access, or random access and so on, and further can be comprised of substantially any suitable type of storage media. It should be understood that all or portions of data store 102 can be included in system 100, or can reside in part or entirely remotely from system 100.

Continuing the discussion of FIG. 1, in one or more aspects of the claimed subject matter, data 104 can be archived by data store 102 according to model 112. Model 112 is an archival model for perpetual sustainability and accessibility of data 104. Appreciably, while many archival services currently exist, no previous archival service has been able to guarantee or even reliably contemplate or provide for perpetual archival of a client's or user's data due to a variety of economic, market, or other factors, many of which are detailed herein. However, briefly, it should be mentioned that, inter alia, economic costs are one primary reason for the inability of conventional services or systems to provide perpetual archival services to their clients. In fact, many technologies or techniques presently exist that can comprise portions of a working perpetual storage framework and/or extend the duration or reliability of data storage. However, no conventional systems or services have developed such a framework or an economically viable way of implementing such a framework in an efficient manner that scales to an online or cloud-type service. Rather, existing systems or services universally maintain non-liability clauses or disclaimers with respect to loss of their clients' data, and further often experience down-time, whether scheduled (e.g., for periodic maintenance) or due to an unplanned-for event, failure, or catastrophe.

In contrast, model 112 can define or describe a framework, a necessary or suitable set of components, or an implementation thereof for perpetual sustainability and accessibility of data 104. Model 112 can provide a cost effective solution to data sustainability while maintaining various checks, safeguards, or standards such that the sustainability can be perpetual. Furthermore, an implementation of the claimed subject matter can responsibly guarantee to client 106 substantially all standard data storage services in perpetuity. Accordingly, while model 112 can describe numerous previously known techniques or technologies, employing the claimed subject matter can result in unexpected results over the use of any one or subset of the known techniques, namely the provision of archival storage in perpetuity.

In accordance therewith and to other related ends, data store 102 can include or be operatively coupled to a set of extensible or exchangeable components described by model 112. The set of components can be implemented at least in part as software components, but will typically be or evolve to be primarily hardware components. By implementing or providing components that are extensible and/or exchangeable, data store 102, its structures or topologies, or those for data 104 can evolve over time without costly overhauls or migrations. Moreover, current storage costs can be kept low by optimizing the set of components that are employed, as well as optimization for each or some components individually. Likewise, future costs can be lowered as well by extending components or plugging in new components to account for later developed or more efficient components, technologies, or techniques. Thus, the actual set of extensible or exchangeable components can change or evolve, but a present minimum set of components, as dictated by model 112 can now be described.

The set of extensible or exchangeable components can include efficient redundancy component 114 that can conform to model 112 for perpetual sustainability and accessibility of data 104. In order to guarantee maintenance of data 104 in perpetuity, data store 102 will typically store redundant copies of data 104 in order to, e.g., protect against hardware failures, network or facility outages, and so forth. However, simply replicating data 104 one or many times can increase overall redundancy, but often not with the efficiency necessary for online or cloud services such as data storage service 108. Thus, efficient redundancy component 114 can facilitate or manage duplication of (as well as additional features in connection with) data 104 in a manner that substantially maximizes redundancy while substantially minimizing costs, which, along with other features, is further detailed in connection with FIG. 2.

The set of extensible or exchangeable components can also include efficient availability component 116 that can conform to model 112 for perpetual sustainability and accessibility of data 104. While efficient redundancy component 114 can suitably ensure data is maintained in spite of failures or the like, efficient availability component 116 can manage persistent accessibility to data 104 in an efficient manner. In particular, efficient availability component 116 can classify all or portions of data 104 in a manner that substantially minimizes costs while exceeding an accessibility threshold described by model 112, and is also further discussed with reference to FIG. 2.

In addition, the set of extensible or exchangeable components can include data integrity component 118 that can conform to model 112 for perpetual sustainability and accessibility of data 104. It should be understood that all existing digital or electronic storage media malfunction or go bad over time even under the most favorable conditions or optimal environments. Thus, regardless of the underlying storage media employed for data 104, model 112 typically must ensure the bits or bytes archived in data store 102 are the same as those originally provided by client 106. In particular, data integrity component 118 can facilitate or manage error detection as well as correction of those errors in a manner that exceeds an integrity threshold described by model 112, which is discussed at length in connection with FIG. 2.

Likewise, model 112 can specify that the set of components include data logistics component 120, which can conform to model 112 for perpetual sustainability and accessibility of data 104. In order to further guarantee both maintenance and availability of data 104 in perpetuity, model 112 typically must include features aimed at protecting data 104 against natural disasters or other geographically-based disasters such as fires, earthquakes, floods, or the like. These and other features can be managed by logistics component 120, which can facilitate or manage distribution of all or portions of data 104 or copies or geo-replications thereof to geographically remote destinations. These distributions as well as various details associated therewith can be based upon a variety of factors, which is also further described in connection with FIG. 2.

Further still, the set of extensible or exchangeable components can include efficient storage component 122 that can conform to model 112 for perpetual sustainability and accessibility of data 104. Considering that information can now be stored in perpetuity, both the benefits derived from such a guarantee as well as the additional aggregative effects of archival without loss, can result in a very large set of information that must be stored efficiently and in a manner that scales to the degree required by a cloud service. Thus, various optimizations can be delegated to efficient storage component 122. These optimizations can be content-specific and can apply globally across all portions of data store 102 or services associated therewith to extract additional storage efficiencies, which is also accounted in more detail with reference to FIG. 2.

It should be appreciated that the above-mentioned components can evolve over time. Moreover, some components might be omitted from a minimum set, while other components can be included, either initially or over time. Furthermore, over time, existing components can be removed, while new components can be added, either independently or to replace the removed component.

Figure 2:
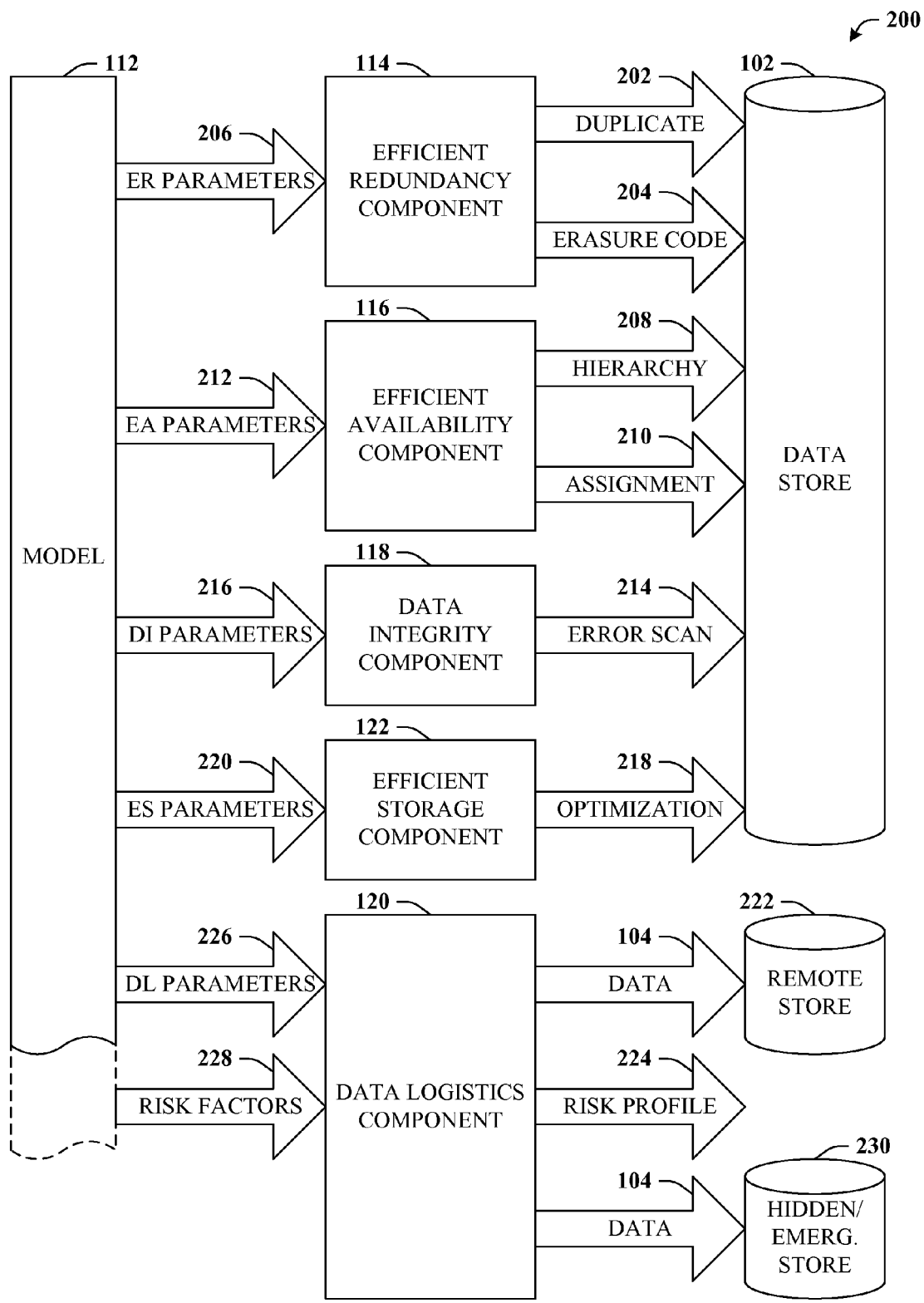
FIG. 2 depicts a block diagram of s system that can provide addition features in connection with perpetual sustainability and accessibility of data.

While still referring to FIG. 1, but turning now also to FIG. 2, system 200 that can provide addition features in connection with perpetual sustainability and accessibility of data is illustrated. In particular, system 200 can include model 112 that can describe a set of extensible or exchangeable components (e.g., component 114-122) that can facilitate perpetual sustainability and accessibility of data 104 as substantially detailed supra. In addition, model 112 can further specify behaviors, tasks, requirements, performance levels, parameters, thresholds or the like that must be met or exceeded by various components.

For example, as introduced previously, model 112 can require efficient redundancy component 114 to facilitate or manage duplication of data 104 in a manner that substantially maximizes redundancy while substantially minimizing costs. Thus, as depicted, one or more duplicate 202 (of data 104) can be stored to data store 102, potentially at a distinct portion of data store 102 such as a separate server or drive relative to data 104, or particular preferred regions of a disk or platter. Moreover, in addition to duplication, model 112 can require efficient redundancy component 114 to facilitate or mange erasure encoding of data 104 or a portion thereof. Thus, erasure encoding 104 can be applied, e.g., at the file level (or another portion) such that a file can be reconstructed from a subset of resultant erasure code 204 in the event any given member of erasure code 204 is lost, destroyed, or otherwise unrecoverable. Efficient redundancy component 114 can also facilitate or manage storage of the resultant erasure code 204 to data store 102. Erasure code 204 can be stored along with data 104 or included in data 104. Thus, it should be appreciated that various features or operation, potentially in connection with other components, that relate to data 104 can relate as well to erasure code 204. For instance, copying or distributing data 104 can include copies or distribution of associated erasure code 204. Appreciably, constructing erasure code 204 and duplicate 202 are merely examples of efficient redundancy, and other examples are contemplated to exist.

In one or more aspects of the claimed subject matter, efficient redundancy component 114 can optimize the erasure encoding based upon, e.g. an amount or size of data 104 or a file or portion thereof, based upon available resources (e.g., storage space, power, computation capabilities), or a current resource utilization at the time of implementation or scheduling of erasure encoding. Appreciably, both duplication and erasure encoding as well as the optimization of the encoding or other techniques can be based upon efficient redundancy parameters 206 set forth by model 112 to ensure actions or operations of efficient redundancy component 114 conforms to perpetual sustainability and accessibility of data 104.

Similarly, model 112 can require efficient availability component 116 to facilitate or manage hierarchical classification of a portion (e.g. a file) of data 104 based upon a historic or an inferred frequency of access to the portion. This hierarchical classification is represented by hierarchy 208, and can be provided in a manner that substantially minimizes costs while exceeding an accessibility threshold consistent with model 112. Thus, the accessibility threshold (as well as other information) can be provided by model 112 in the form of efficient availability parameters 212. As with the above and other aspects described herein, hierarchy 208 is intended to be exemplary and other availability techniques or technologies can be employed.

Regardless, to provide more detail, efficient availability component 116 can classify a file included in data 104 according to tiers representing the frequency of access. For example, the file can be classified as hot or warm when accessed frequently, yet cold when accessed infrequently to very cold when rarely or never accessed. Appreciably, other classifications can exist and can be of varying levels of granularity or specificity, with the above serving merely as an example. It should be understood that in the case where the file has no access history, such can be inferred, potentially based upon the type of file (e.g., the file format or the content). Moreover, it should be further understood that while the file might be classified as hot, a duplicate 202 or a second, third, or n-th duplicate 202 (or erasure code 204) can be classified as cold or very cold.

Regardless, in one or more aspects, efficient availability component can assign the file (or other portion of data 104) to a suitable section of data store 102 or, more particularly, to a suitable storage medium based upon the hierarchical classification, which is graphically depicted by assignment 210. For instance, very hot data might be cached in RAM or in a fast disk, whereas data with more infrequent access can be placed in drives that are spun down or have other resource-saving features enabled or even placed in tapes or optical media that can generally be maintained in a more cost-effective manner for some types of data. Appreciably, these and other features can be defined by efficient availability parameters 212.

In one or more aspects of the claimed subject matter, model 112 can further require data integrity component 118 to facilitate or manage error detection and error correction for data 104 or a portion of file thereof in a manner that exceeds an integrity threshold. Data integrity component 118 can effectuation error detection/correction by way of error scan 214, which can be performed on the fly when data 104 is accessed. Additionally or alternatively, data integrity component 118 can facilitate periodic error detection scans of data 104 (or associated files or copies) even when no access (e.g., transaction 110) with respect to the file occurs.

For example, data integrity component 118 can maintain an indication of when a particular file was last subject to error scan 214. For files that are frequently accessed, this indication can be a relatively recent time or date, but for files that are infrequently or never accessed, the integrity of data included in those files should be verified without awaiting an associated transaction 110. Thus, data integrity component 118 can perform or schedule error scan 214 with respect to files that might otherwise fall below the data integrity threshold, which can be specified by model 112 consistent with perpetual sustainability and accessibility of data 104 by way of data integrity parameters 216. Moreover, data integrity component 118 can schedule error scan 214 based upon the integrity threshold of other collocated or related files (or similarly classified data assigned to similar or the same storage media) and/or based upon resource utilization associated with managing or maintaining data store 102.

Still further, in accordance with one or more aspects of the claimed subject matter, model 112 can require efficient storage component 122 to facilitate or manage storage optimization techniques for data 104 in a manner that substantially minimizes costs and can be applied across substantially all portion of data store 102 or other stores as well as to all or portions of data 104 or duplicates thereof. Such optimization techniques are illustrated by reference numeral 218, and can be defined or specified by model 112 by way of efficient storage parameters 220. To provide concrete illustrations, the storage optimization techniques can include block-level de-duplication, byte-level de-duplication, various types of compression, or other content-specific optimizations.

Furthermore, model 112 can require data logistics component 122 to facilitate or manage distribution of data 104 or a portion thereof as well as associated duplicates. The distribution can relate to moving or copying data 104 to remote data store 222, which can be characterized by a geographically remote section of data store 102 or to a geographically remote disparate data store. Such distribution can be based upon disaster risk profile 224 that is provided or defined by model 112 in the form of data logistic parameters 226, or constructed by data logistics component 120 based at least in part upon data logistics parameters 226. As used herein, "geographically remote" is intended to mean a substantial distance between the origin and destination in terms of global geography. More specifically, geographically remote can relate to a distance of at least several miles to well over hundreds of miles or kilometers between the source and destination.

In addition, in one or more aspect of the claimed subject matter, data logistics component 120 can continually monitor various risk factors 228 in order to update or create disaster risk profile 224, wherein risk factors 228 can be (but need not be) defined or specified by model 112, yet information associated with various risks can be obtained from any suitable source (e.g., news, surveys, studies . . . ). Risk factors 228 can relate to, inter alia, geological risk factors (e.g., earthquakes, eruptions), accident risk factors (e.g., fires, destructive behavior), weather risk factors (e.g., hurricanes, thunderstorms, floods . . . ), geopolitical risk factors (e.g., conflict, treatise . . . ), adversarial attack risk factors (e.g., hackers, insider attacks, denial of service attacks . . . ), and so on. Regardless of the type of risk factors, data logistics component 120 and/or model 112 can intelligently evaluate any or all relevant information in a persistent or continual manner in order to weight various risks to perpetual storage. Moreover, data logistics component 120 can operate in conjunction with efficient redundancy component 114 or efficient availability component 116 (or be delegated the associated duties independently by model 112) to prevent or mitigate denial of service attacks.

It should be further appreciated that data logistics component 120 can distinguish between a move of data 104 and a copy of data 104 when distributing or propagating data 104 based upon disaster risk profile 224. For example, a risk of security compromise can require a move (e.g., not maintaining data 104 at an original or previous location) of data 104 to remote store 22, whereas a risk of disaster due to strong weather might or might not be better served by copying (e.g., higher redundancy versus an increase to costs). In other words, data logistics component 120 can intelligently determine or infer a necessity according to model 112 and/or data logistics parameters 226 to move or copy data 104 or portions thereof to remote store 222 based upon disaster risk profile 224.

Furthermore, one or more remote stores 222 can be a hidden or emergency data store, which is depicted separately by reference numeral 230. More specifically, to conform with model 112 for perpetually sustainability and accessibility of data 104, emergency store 230 can be kept secret from numerous entities, potentially including client 106, all or a subset of personnel associated with data storage service 108, and even from many pluggable components included in the set of extensible or exchangeable components described by model 112. Thus, in one or more aspects of the claimed subject matter, emergency reserve store 230 can be inaccessible, opaque, or unknown to, e.g., efficient redundancy component 114 and/or efficient availability component 116. Therefore, in one or more aspects, emergency reserve store 230 can excluded from redundancy or availability computations or determinations, thus providing an additional layer of insurance beyond any thresholds, no matter how conservative. Appreciably, emergency reserve store 230 can add to costs, but can be safer in times of widespread turmoil, and can conceivably be physically situated in satellite orbit or possibly hosted on celestial bodies other than earth.

Figure 3:
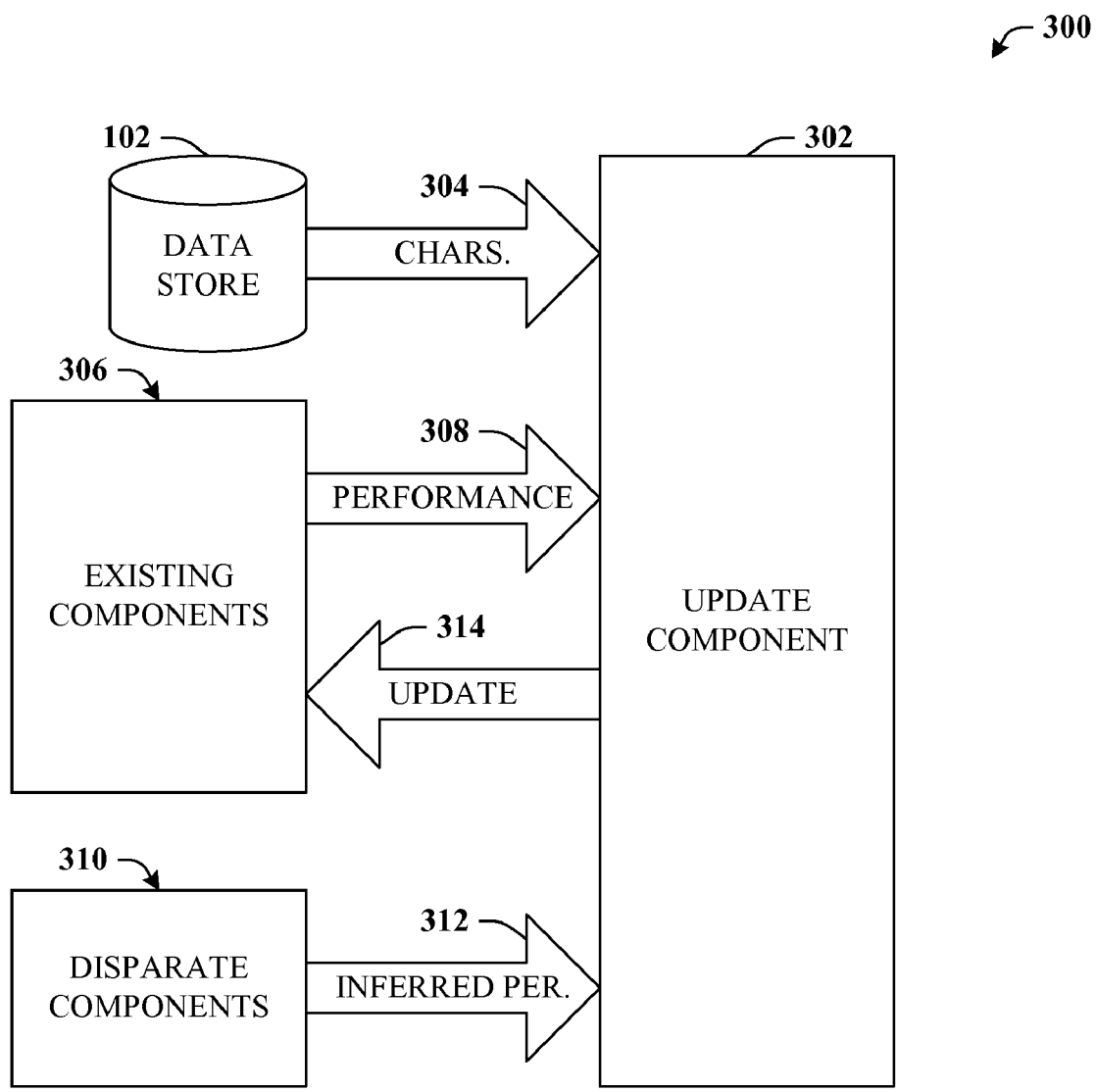
FIG. 3 provides block diagram of a system that can facilitate automatic or dynamic updates to the set of extensible or exchangeable components or individual components in the set.

Turning now to FIG. 3, system 300 that can facilitate automatic or dynamic updates to the set of extensible or exchangeable components or individual components in the set is provided. In general, system 300 can include all components detailed in connection with FIG. 1 or that are otherwise suitable in connection with the claimed subject matter. In addition, system 300 can include update component 302 that can continually monitor in real time a variety of aspects, performance levels, data sets and so forth. In particular, update component 302 can monitor data included in data store 102 such as data 104. Additionally, update component 302 can monitor various characteristics 304 associated with data 104 such as, e.g., the composition of data 104 (e.g., the types or proportions of content or certain file formats).

Furthermore, updated component 302 can also monitor observed performance characteristics 308 associated with one or more existing component 306, where existing component 306 can be the components defined by model 112 to be included in the set of extensible or exchangeable components, as discussed supra in connection with FIG. 1. Similarly, one or more disparate extensible or exchangeable components 310 not included in the set can be monitored, as well as inferred performance characteristics 312 for disparate component 310 in connection with data 104 or associated characteristics 304. Appreciably, inferred performance characteristics 312 can be based upon simulations or test.

In accordance therewith, update component 302 can dynamically extend or exchange (by way of update 314) one or more existing components 306 with all or a portion of one or more disparate component 310, e.g., when an advantage is identified according to model 112. Appreciably, update 314 can be performed automatically.

Figure 4:
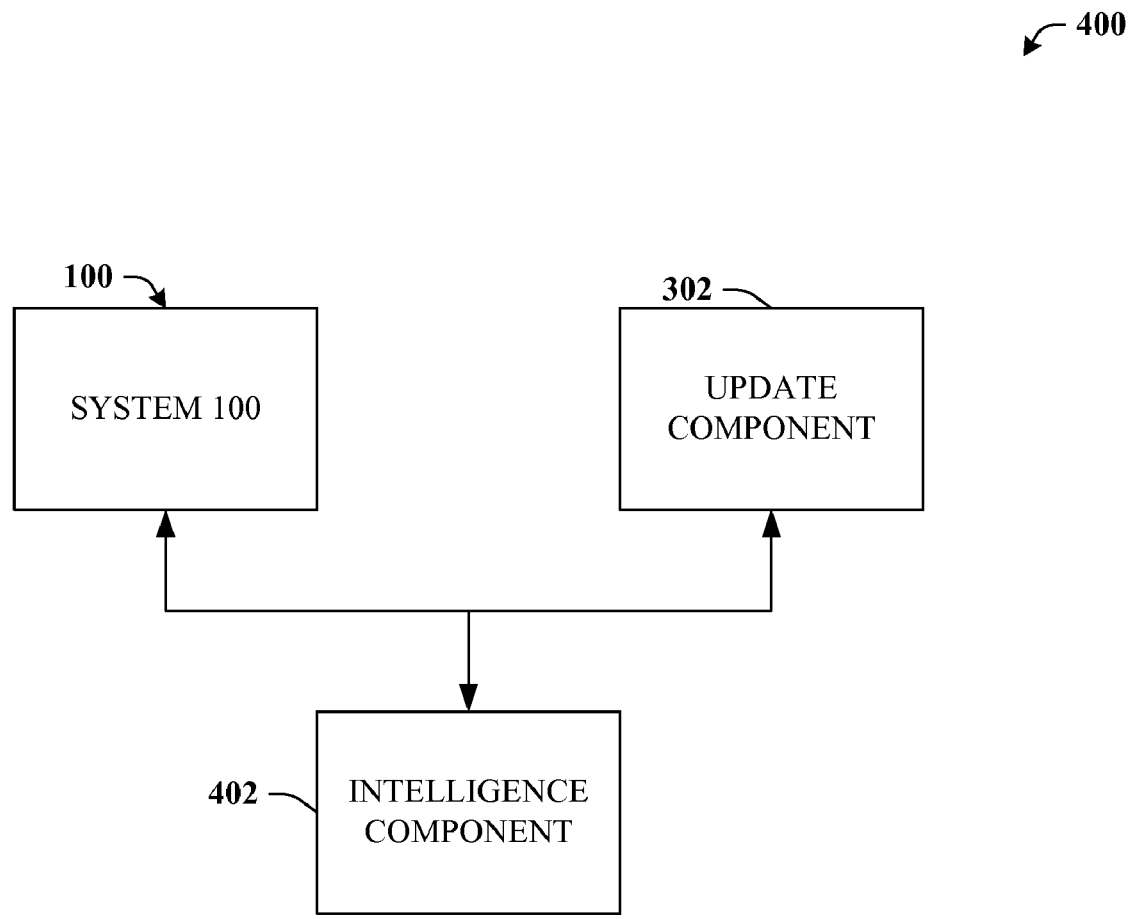
FIG. 4 is a block diagram of a system that can provide for or aid with various inferences or intelligent determinations.

Turning now to FIG. 4, system 400 that can provide for or aid with various inferences or intelligent determinations is depicted. Generally, system 400 can include all or portions of system 100, such as model 112, and all or portions of the set of extensible or exchangeable components as substantially described herein. In addition to what has been described, the above-mentioned components can make other intelligent determinations or inferences, either individually or in connection with or at the direction of model 112. For example, model 112 (or efficient redundancy component 114) can intelligently determine or infer a suitable number of duplicates 202 to maintain in data store 102 (or other stores 222), as well as where in the stores 102, 222 to allocated data 104. Moreover, optimization of erasure encoding can be intelligently determined or inferred as described supra.

Likewise, model 112 or efficient availability component 116 can intelligently determine or infer the frequency of access based upon content-specific models or data sets, client 106 behavior or preferences and so forth. Also, model 112 or data integrity component 118 can intelligently determine or infer when to run or schedule errors scan 214 based on the integrity threshold as well as scheduled or observed resource utilization. Still further, model 112 or data logistics component 120 can intelligently determine or infer when to employ emergency reserve store 230, while efficient storage component 122 can intelligently determine or infer content-specific optimizations e.g., when applying optimizations to similar content types or the like.

Additionally, system 400 can include update component 302 can intelligently determine or infer when to update existing component 306 with disparate component 310 based upon performance comparisons as well as based upon resources utilization or behavior associated with client 106. Appreciably, any of the foregoing inferences can potentially be based upon, e.g. Bayesian probabilities or confidence measures or based upon machine learning techniques related to historical analysis, feedback, and/or previous other determinations or inferences.

In addition, system 400 can also include intelligence component 402 that can provide for or aid in various inferences or determinations. In particular, in accordance with or in addition to what has been described supra with respect to intelligent determination or inferences provided by various components described herein. For example, all or portions of system 100, update component 302 (as well as other components described herein) can be operatively coupled to intelligence component 402. Additionally or alternatively, all or portions of intelligence component 402 can be included in one or more components described herein. Moreover, intelligence component 402 will typically have access to all or portions of data sets described herein.

In accordance with the above, in order to provide for or aid in the numerous inferences described herein, intelligence component 402 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
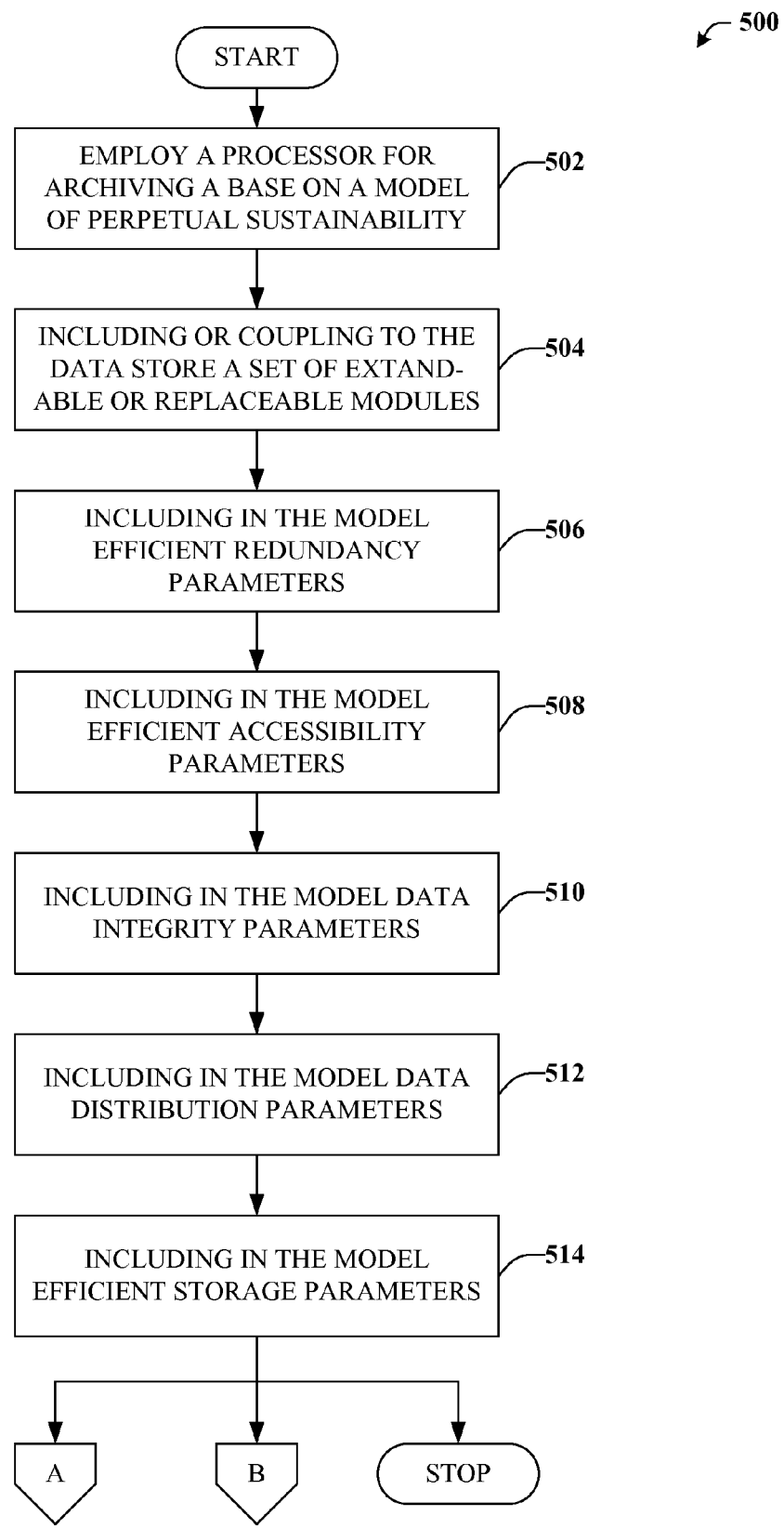
FIG. 5 depicts an exemplary flow chart of procedures that define a method for facilitating perpetual sustainability and accessibility of data.
Figure 6:
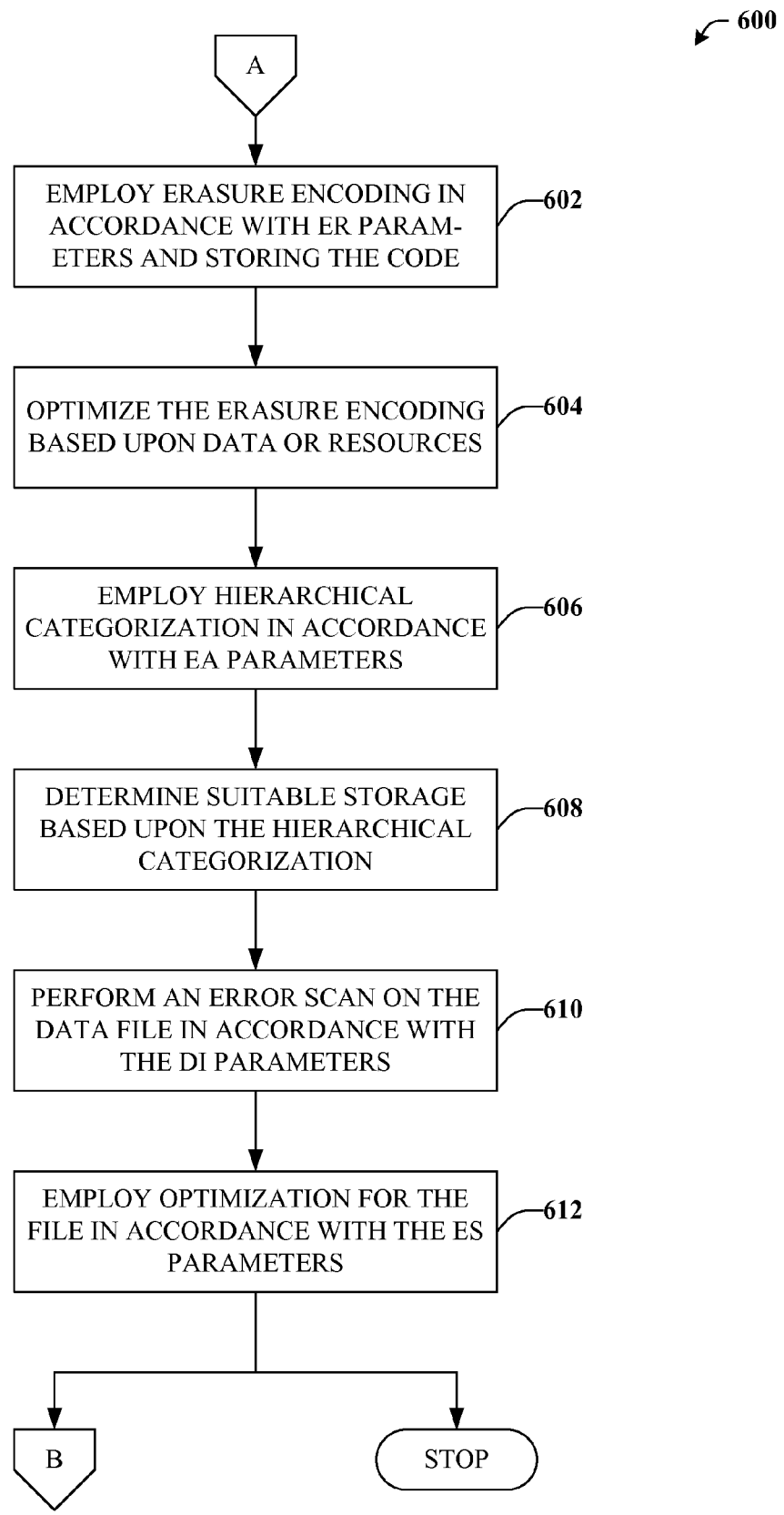
FIG. 6 illustrates an exemplary flow chart of procedures that define a method for providing addition features in connection with facilitating perpetual sustainability and accessibility with respect to redundancy, availability, and efficient storage.
Figure 7:
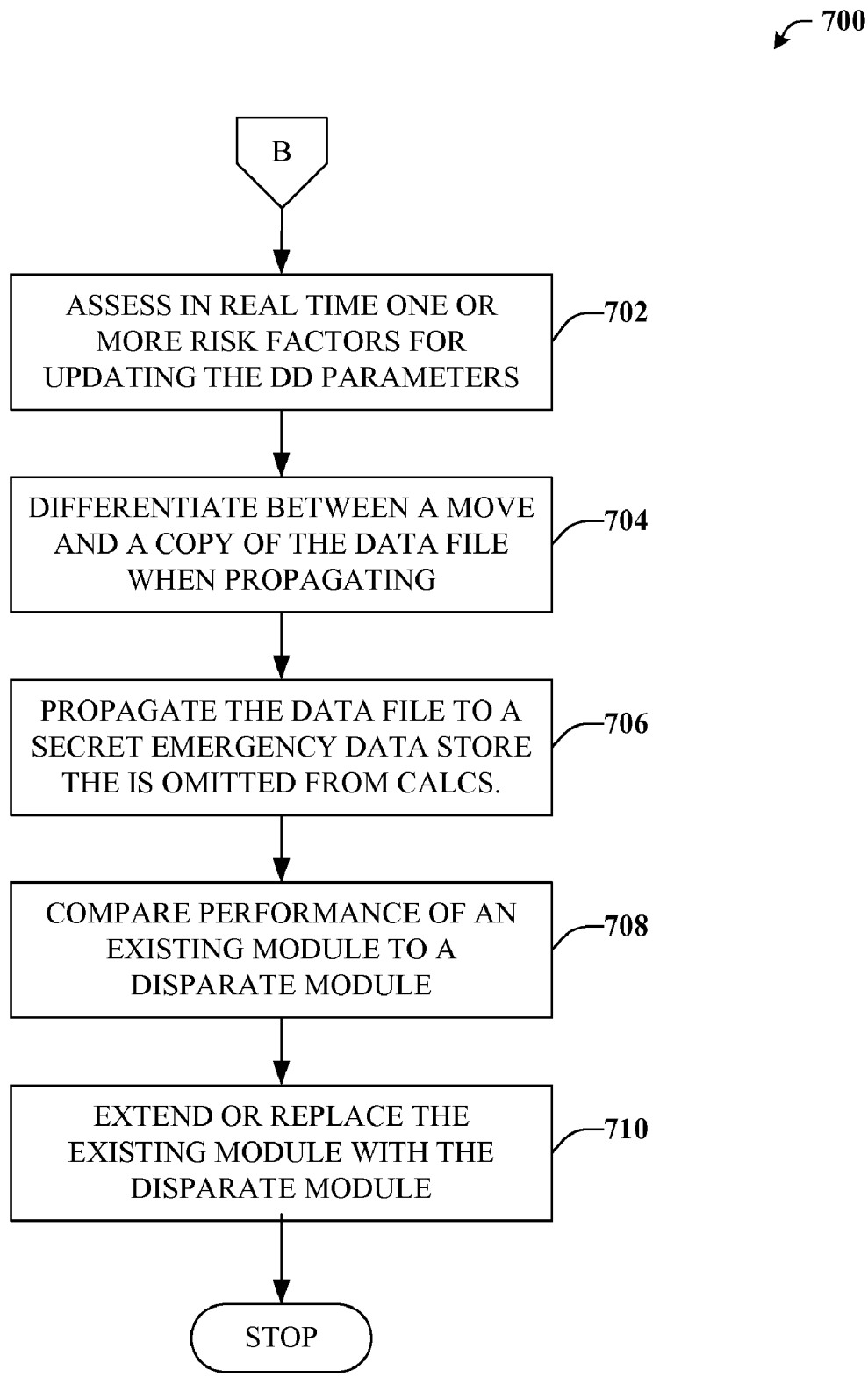
FIG. 7 depicts an exemplary flow chart of procedures defining a method for providing addition features in connection with facilitating perpetual sustainability and accessibility with respect to distribution and module updating.

FIGS. 5, 6, and 7 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 5, exemplary computer implemented method 500 for facilitating perpetual sustainability and accessibility of data is provided. Generally, at reference numeral 502, a processor can be employed for archiving one or more data files for a client of a data storage service. Appreciably, the data files can be archived to a network-accessible data store that is implemented in conformance with an online service and a model for perpetual sustainability and availability of the data files.

Moreover, at reference numeral 504, a set of extendable or replaceable modules or components defined by the model can be included in or operatively coupled to the data store. Thus, the set of modules can effectuate a guarantee of perpetual sustainability and availability of the data file(s) of the client in accordance with the model.

In particular, at reference numeral 506, efficient redundancy parameters can be included in the model. The efficient redundancy parameters can be suitable or optimal for duplicating or reconstructing the data file(s) in a perpetual or sustainable manner. Likewise, at reference numeral 508, efficient accessibility parameters can be included in the model, wherein the efficient accessibility parameters can be suitable or optimal for sustaining data availability for the client that exceeds an availability threshold in a manner that is perpetual.

Similarly, at reference numeral 508, data integrity parameters can be included in the model. The data integrity parameters can be suitable or optimal for exceeding an integrity threshold for the data file(s) in a manner that is sustainable and perpetual. At reference numeral 510, data distribution parameters can be included in the model. The data distribution parameters can be suitable or optimal for propagating the data file based upon current or future risk factors associated with a geographical or a physical location of the data file or the data store hosting the data file. Last to be described, at reference numeral 512, efficient storage parameters can be included in the model as well. The efficient storage parameters can be suitable or optimal for storage optimization in a manner that is sustainable and perpetual. Appreciably, sustainable and/or perpetual in connection with the methods described herein can be substantially similar to the features of perpetual sustainability and/or accessibility detailed supra.

Referring to FIG. 6, exemplary computer implemented method 600 for providing for providing addition features in connection with facilitating perpetual sustainability and accessibility with respect to redundancy, availability, and efficient storage is depicted. At reference numeral 602, erasure encoding can be applied the data file. The erasure encoding can be applied in accordance with the efficient redundancy parameters detailed with respect to reference numeral 506. Moreover, resultant erasure code can be stored to the data store associated with the data file or included in the data file as described supra.

Moreover, at reference numeral 604, the erasure encoding can be optimized based upon at least one of a size of the date file, available resources, or resource utilization at the time of erasure encoding, whether presently or scheduled at a future time or data. Regarding reference numeral 606, hierarchical categorization for the data file can be employed in accordance with the efficient accessibility parameters detailed in connection with reference numeral 508. Appreciably, the hierarchical categorization for the data file can be based upon frequency of access to the data file.

In addition, at reference numeral 608 a portion of the data store or a suitable or optimal storage medium can be determined for the data file based upon the hierarchical categorization. Hence, data files that are infrequently accessed can be archived to more cost-effective storage, while data files that are frequently accessed can be archived to storage that is more quickly available, all according to the hierarchical categorization.

Furthermore, at reference numeral 610, an error detection and correction scan can be performed on the data file in accordance with the data integrity parameters introduced with respect to reference numeral 510. It should be understood that the error detection and correction scan can be instantiated upon access to the data file by the client, or based upon periodic scheduling. At reference numeral 612, various optimizations can be employed in accordance with the efficient storage parameters described in connection with reference numeral 514. The optimizations can include, e.g., block-level de-duplication, byte-level de-duplication, content-specific compression, other content-specific optimizations.

With reference now to FIG. 7, method 700 for providing for providing addition features in connection with facilitating perpetual sustainability and accessibility with respect to distribution and module updating is illustrated. At reference numeral 702, a variety of risk factors can be assessed in real time for creating or updating the data distribution parameters described in connection with reference numeral 512. By way of illustration, the risk factors can relate to geological risk factors, accident risk factors, weather risk factors, geopolitical risk factors, or adversarial attack risk factors.

Continuing on, at reference numeral 704, when propagating the data file according to the distribution parameters a distinction can be made between a move and a copy of the data file. For instance, moving the data file can be preferable over duplication at a remote site in some cases, whereas the reverse can be true in other cases. In addition, at reference numeral 706, the data file can be propagated (by way of a move or a copy operation) to a secret emergency data store that is hidden from at least a subset of the modules or specifically absent or omitted from efficient redundancy or efficient accessibility parameters, calculation, determinations, or inferences.

Furthermore, at reference numeral 708, a variety of data can be monitored or analyzed. For example, characteristics of the data files, performance associated with an existing module included in the set of extendable or replaceable modules, as well as an inferred performance of a disparate module not included in the set can all be monitored or analyzed. Thus, also at reference numeral 708, the performance of the existing module can be compared to the inferred performance of the disparate module. In accordance therewith, at reference numeral 710, the existing module can be extended or replaced with all or a portion of the disparate module when a benefit is identified in connection with perpetual sustainability and accessibility of the data file.

Figure 8:
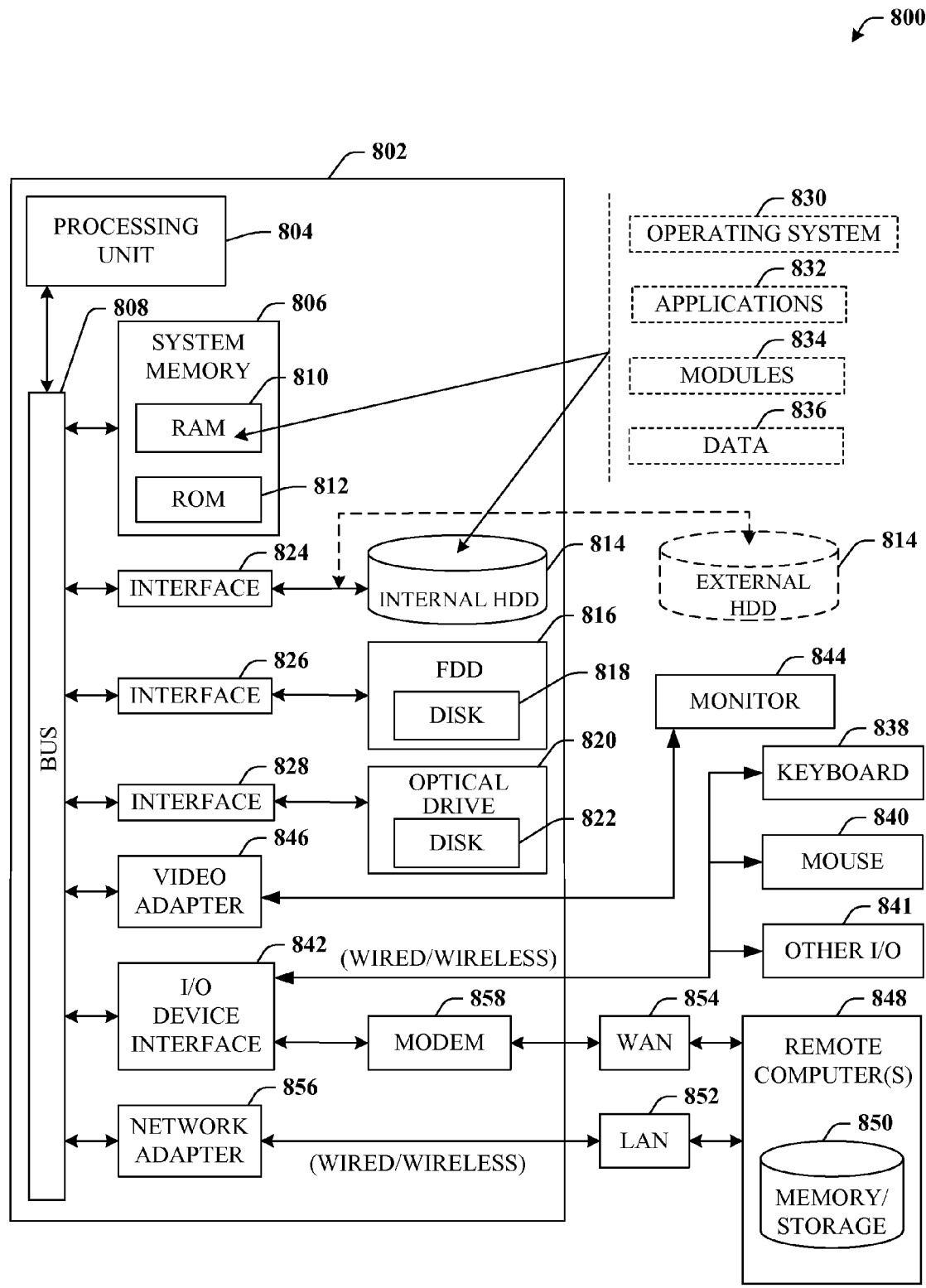
FIG. 8 illustrates a block diagram of a computer operable to execute or implements all or portions of the disclosed architecture.

Referring now to FIG. 8, there is illustrated a block diagram of an exemplary computer system operable to execute the disclosed architecture. In order to provide additional context for various aspects of the claimed subject matter, FIG. 8 and the following discussion are intended to provide a brief, general description of a suitable computing environment 800 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the claimed subject matter includes a computer 802, the computer 802 including a processing unit 804, a system memory 806 and a system bus 808. The system bus 808 couples to system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g. reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the claimed subject matter can be implemented with various commercially available operating systems or combinations of operating systems.

A user can enter commands and information into the computer 802 through one or more wired/wireless input devices, e.g. a keyboard 838 and a pointing device, such as a mouse 840. Other input devices 841 may include a speaker, a microphone, a camera or another imaging device, an IR remote control, a joystick, a game pad, a stylus pen, touch screen, or the like. These and other input devices are often connected to the processing unit 804 through an input-output device interface 842 that can be coupled to the system bus 808, but can be connected by other interfaces, such as a parallel port, an IEEE1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, a mobile device, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g. the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 8 Mbps (802.11b) or 54 Mbps (802.11a) data rate, for example, or with products that contain both bands (dual band), so the networks can provide real-world performance similar to the basic "10 BaseT" wired Ethernet networks used in many offices.

Figure 9:
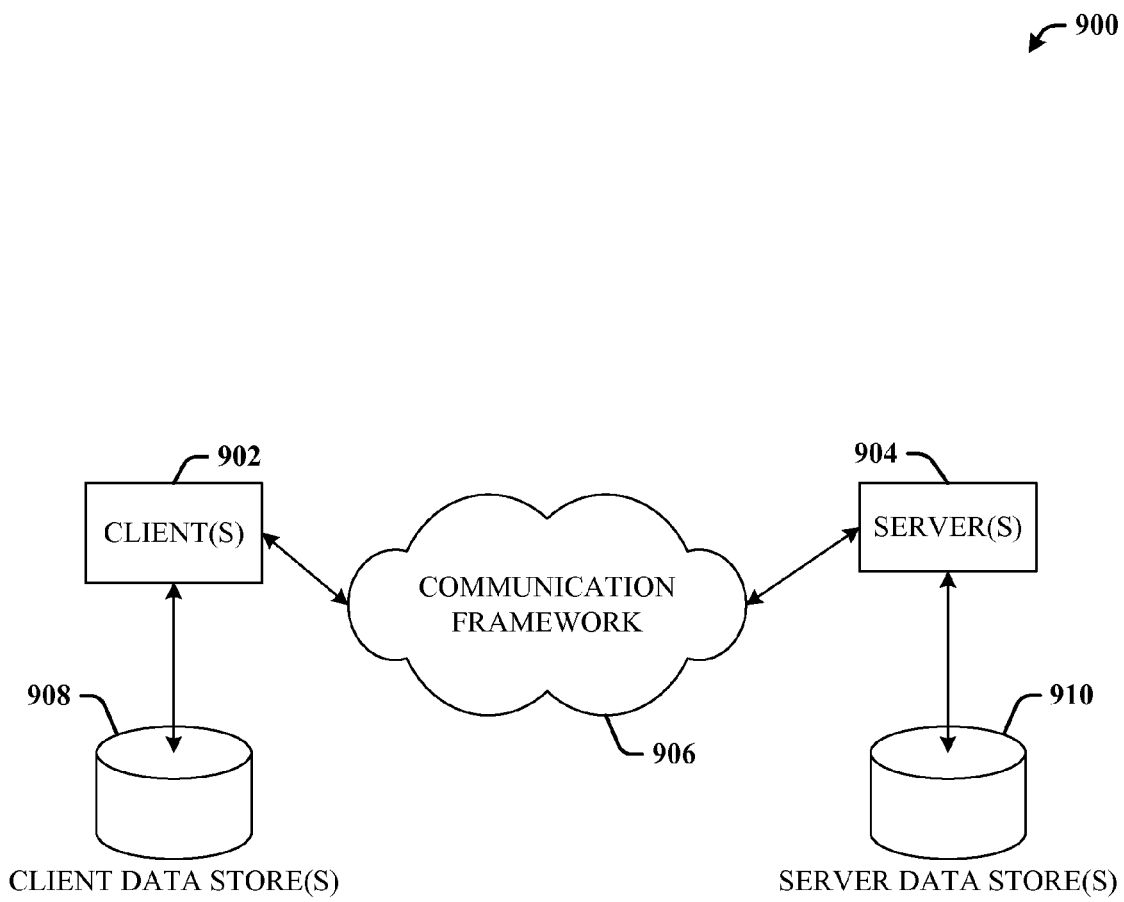
FIG. 9 illustrates a schematic block diagram of an exemplary computing environment.

Referring now to FIG. 9, there is illustrated a schematic block diagram of an exemplary computer compilation system operable to execute the disclosed architecture. The system 900 includes one or more client(s) 902. The client(s) 902 can be hardware and/or software (e.g., threads, processes, computing devices). The client(s) 902 can house cookie(s) and/or associated contextual information by employing the claimed subject matter, for example.

The system 900 also includes one or more server(s) 904. The server(s) 904 can also be hardware and/or software (e.g., threads, processes, computing devices). The servers 904 can house threads to perform transformations by employing the claimed subject matter, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g. a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
a network-accessible data store that archives data for a client of an associated data storage service according to a model for perpetual sustainability and accessibility of the data, the data store including or operatively coupled to at least a memory and a processor that implement a set of extensible or exchangeable components described by the model, the set comprising:
an efficient redundancy component that conforms to the model for perpetual sustainability and accessibility of the data;
an efficient availability component that conforms to the model for perpetual sustainability and accessibility of the data;
a data integrity component that conforms to the model for perpetual sustainability and accessibility of the data;
a data logistics component that conforms to the model for perpetual sustainability and accessibility of the data, the data logistics component configured to:
monitor one or more risk factors to update a disaster risk profile; and
facilitate moving or copying of the data to a remote section of the data store or to a remote data store based on the disaster risk profile, the data logistics component configured to facilitate moving the data if the disaster risk profile indicates a security compromise to the data in the data store, and the data logistics component configured to facilitate copying the data if the disaster risk profile indicates a risk of a natural disaster; and
an efficient storage component that conforms to the model for perpetual sustainability and accessibility of the data.

2. The system of claim 1, wherein the efficient redundancy component is configured to facilitate or manage duplication of the data.

3. The system of claim 1, wherein the efficient redundancy component is configured to facilitate or manage erasure encoding of at least a portion of the data and store resultant erasure code along with the data.

4. The system of claim 3, wherein the efficient redundancy component is further configured to optimize the erasure encoding based upon at least one of an amount or size of the at least the portion of the data, available resources, or resource utilization.

5. The system of claim 1, wherein the efficient availability component is configured to facilitate or manage hierarchical classification of a portion of the data based upon a historic or an inferred frequency of access to the portion.

6. The system of claim 5, wherein the efficient availability component is further configured to assign the portion to a section of the data store or to a storage medium based upon the hierarchical classification.

7. The system of claim 1, wherein the data integrity component is configured to facilitate or manage error detection and error correction for at least a portion of the data in a manner that exceeds an integrity threshold.

8. The system of claim 7, wherein the data integrity component is further configured to facilitate error detection upon access to the at least the portion of the data.

9. The system of claim 1, wherein the data integrity component is configured to facilitate periodic error detection scans of at least the portion of the data that is infrequently accessed or would otherwise fall below an integrity threshold.

10. The system of claim 1, wherein the one or more risk factors comprise one or more geological risk factors, accident risk factors, weather risk factors, geopolitical risk factors, or adversarial attack risk factors.

11. The system of claim 1, wherein the remote data store is one of an emergency reserve data store that is inaccessible, opaque, or unknown to the efficient redundancy component and the efficient availability component, or located at a site that is orbital or non-terrestrial.

12. The system of claim 1, wherein the efficient storage component is configured to facilitate or manage storage optimization techniques for the data.

13. The system of claim 12, wherein the storage optimization techniques include at least one of block-level de-duplication, byte-level de-duplication, content-specific compression, or content-specific optimization.

14. The system of claim 1, further comprising an update component that monitors (1) the data and characteristics associated with the data, (2) an existing component included in the set of extensible or exchangeable components, and (3) a disparate extensible or exchangeable component not included in the set;
the update component configured to dynamically extend or exchange the existing component with all or a portion of the disparate component when an advantage is identified according to the model.

15. A computer-implemented method comprising:
employing processor for archiving a data file for a client of a data storage service in a network-accessible data store that conforms to a model for perpetual sustainability and availability of the data file;
including in or operatively coupling to the data store a set of extendable or replaceable modules defined by the model;
including in the model efficient redundancy parameters for duplicating or reconstructing the data file in a perpetual or sustainable manner;
including in the model efficient accessibility parameters for sustaining data availability for the client that exceeds an availability threshold;
including in the model data integrity parameters for exceeding an integrity threshold for the data file;
including in the model data distribution parameters for propagating the data file based upon current or future risk factors associated with a geographical or physical location of the data file or the data store, the current or future risk factors used to create a disaster risk profile that can be used to facilitate moving or copying of the data file; and
including in the model efficient storage parameters for storage optimization;
assessing in real time at least one of geological risk factors, accident risk factors, weather risk factors, geopolitical risk factors or adversarial attack risk factors for creating or updating the data distribution parameters; and
facilitating a move or a copy of the data file to a remote section of the data store or to a remote data store based on the distribution parameters, the facilitating comprising moving the data if the disaster risk profile indicates a security compromise to the data in the data store, and copying the data if the disaster risk profile indicates a risk of a natural disaster.

16. The method of claim 15, further comprising at least one of the following acts:
employing erasure encoding for the data file in accordance with the efficient redundancy parameters and storing resulting erasure code to the data store;

optimizing the erasure encoding based upon at least one of a size of the data file, available resources, or resource utilization at the time of erasure encoding;

employing hierarchical categorization for the data file based upon frequency of access to the data file in accordance with the efficient accessibility parameters;

determining a portion of the data store or a suitable storage medium for the data file based upon the hierarchical categorization;

performing an error detection and correction scan on the data file in accordance with the data integrity parameters; or employing at least one of block-level de-duplication, byte-level de duplication, content-specific compression, or content-specific optimization for the file in accordance with the efficient storage parameters.

17. The method of claim 15, further comprising at least one of the following acts:

propagating the data file to a secret emergency data store that is hidden from at least a subset of the modules or specifically absent or omitted from efficient redundancy or efficient accessibility calculations, determinations, or inferences;

monitoring characteristics of the data file, performance associated with an existing module included in the set of extendable or replaceable modules, and comparing the performance to an inferred performance of a disparate module not included in the set; or extending or replacing the existing module with all or a portion of the disparate module when a benefit is identified in connection with perpetual sustainability and accessibility of the data file.

18. A computer-implemented system comprising:

a network-accessible data store that archives data for a client of an associated data storage service according to a model for perpetual sustainability and accessibility of the data, the data store including or operatively coupled to at least a memory and a processor that implement a set of extensible or exchangeable components described by the model, the set comprising:

an efficient redundancy component that conforms to the model for perpetual sustainability and accessibility of the data;

an efficient availability component that conforms to the model for perpetual sustainability and accessibility of the data;

a data integrity component that conforms to the model for perpetual sustainability and accessibility of the data;

a data logistics component that conforms to the model for perpetual sustainability and accessibility of the data, the data logistics component configured to:

monitor one or more risk factors to update a disaster risk profile; and facilitate moving or copying of the data to a remote section of the data store or to a remote data store based on the disaster risk profile, the data logistics component configured to facilitate moving the data if the disaster risk profile indicates a security compromise to the data in the data store, and the data logistics component configured to facilitate copying the data if the disaster risk profile indicates a risk of a natural disaster; and an efficient storage component that conforms to the model for perpetual sustainability and accessibility of the data; and an update component that monitors a performance associated with an existing component included in the set of extensible or exchangeable components and compares the performance to an inferred performance of a disparate extensible or exchangeable component not included in the set in connection with features of the data or the data store.

* * * * *